United States Patent [19]

Mizukami et al.

[11] Patent Number: 4,796,112
[45] Date of Patent: Jan. 3, 1989

[54] ACTUATOR ACCESS CONTROL SYSTEM FOR A MAGNETIC HEAD USING TRAPEZOIDAL DRIVE CURRENT

[75] Inventors: Makoto Mizukami; Koji Otani; Shuichi Takanami, all of Tokyo, Japan

[73] Assignee: Nippon Telegraph and Telephone Corporation, Tokyo, Japan

[21] Appl. No.: 934,059

[22] Filed: Nov. 24, 1986

[30] Foreign Application Priority Data

Nov. 26, 1985 [JP] Japan ............................ 60-263699

[51] Int. Cl.$^4$ ............................................ G11B 5/55
[52] U.S. Cl. .................................... 360/78.07; 360/75
[58] Field of Search ............................ 360/75, 78, 77; 318/561, 563, 571

[56] References Cited

U.S. PATENT DOCUMENTS

| | | | |
|---|---|---|---|
| 3,798,427 | 3/1974 | Conners | 318/571 |
| 3,828,236 | 8/1974 | Close | 318/561 |
| 4,342,378 | 8/1982 | Hmelovsky | 318/561 |

Primary Examiner—Raymond F. Cardillo
Assistant Examiner—David L. Robertson
Attorney, Agent, or Firm—Armstrong, Nikaido, Marmelstein & Kubovcik

[57] ABSTRACT

An actuator which carries a magnetic head of a disk memory seeks a track on the disk by being actuated by a pair of trapezoidal drive currents, which have no or less power spectrum at the frequency coinciding with the mechanical resonance frequency of the positioning mechanisms. A trapezoidal waveform whose ratio of an upper side to a bottom side is adjusted depending on seek stroke. The mechanical resonance frequency may be within the range of the power spectrum of the trapezoidal drive currents so long as it coincides with the characteristic frequency with a zero power spectrum. A constant velocity region which has no current flowing into the actuator between the first positive trapezoidal current and the second negative trapezoidal current is provided when the seek stroke is long.

11 Claims, 17 Drawing Sheets

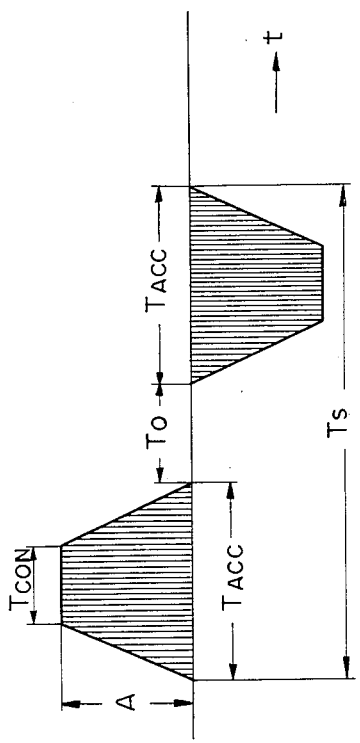
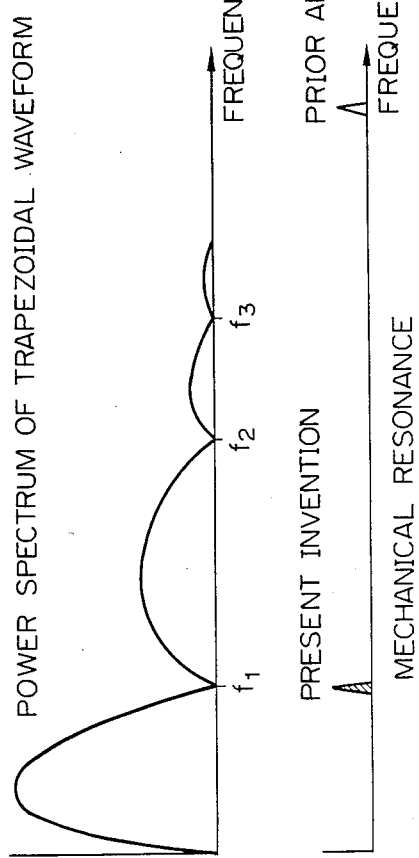
Fig. IA
Fig. IB

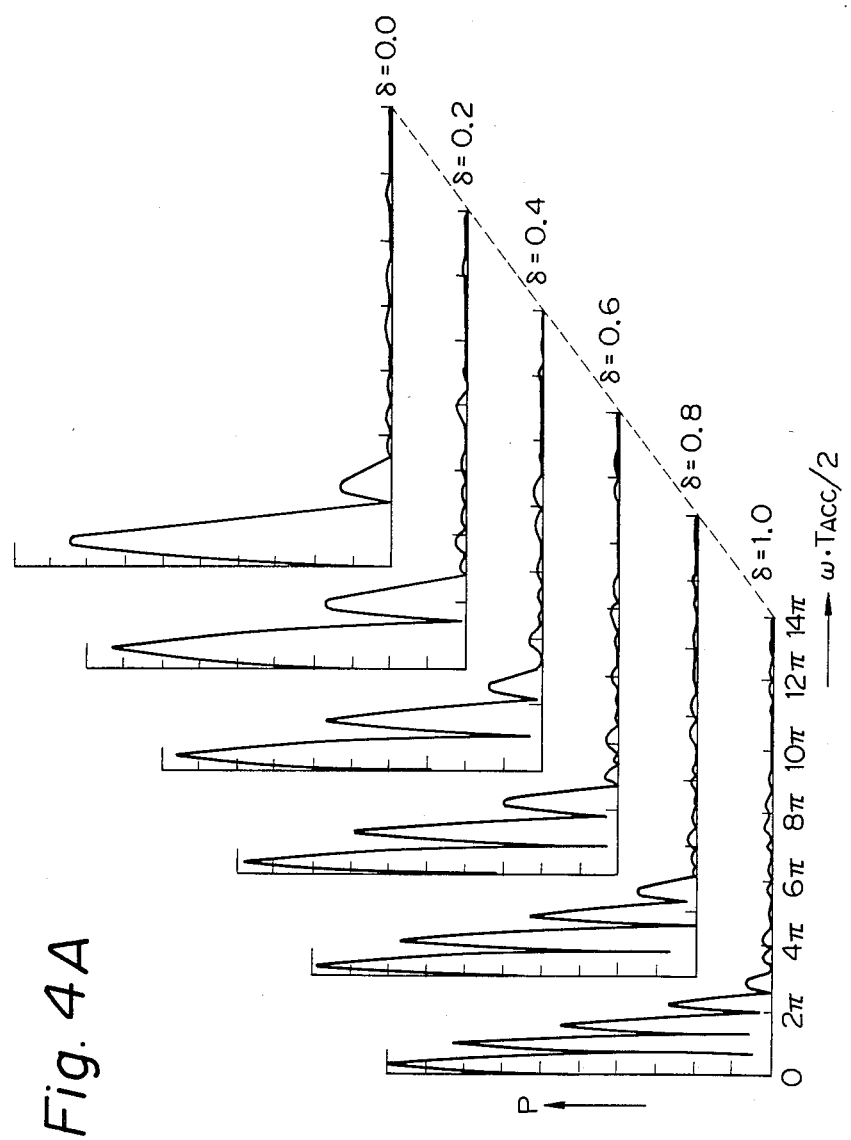

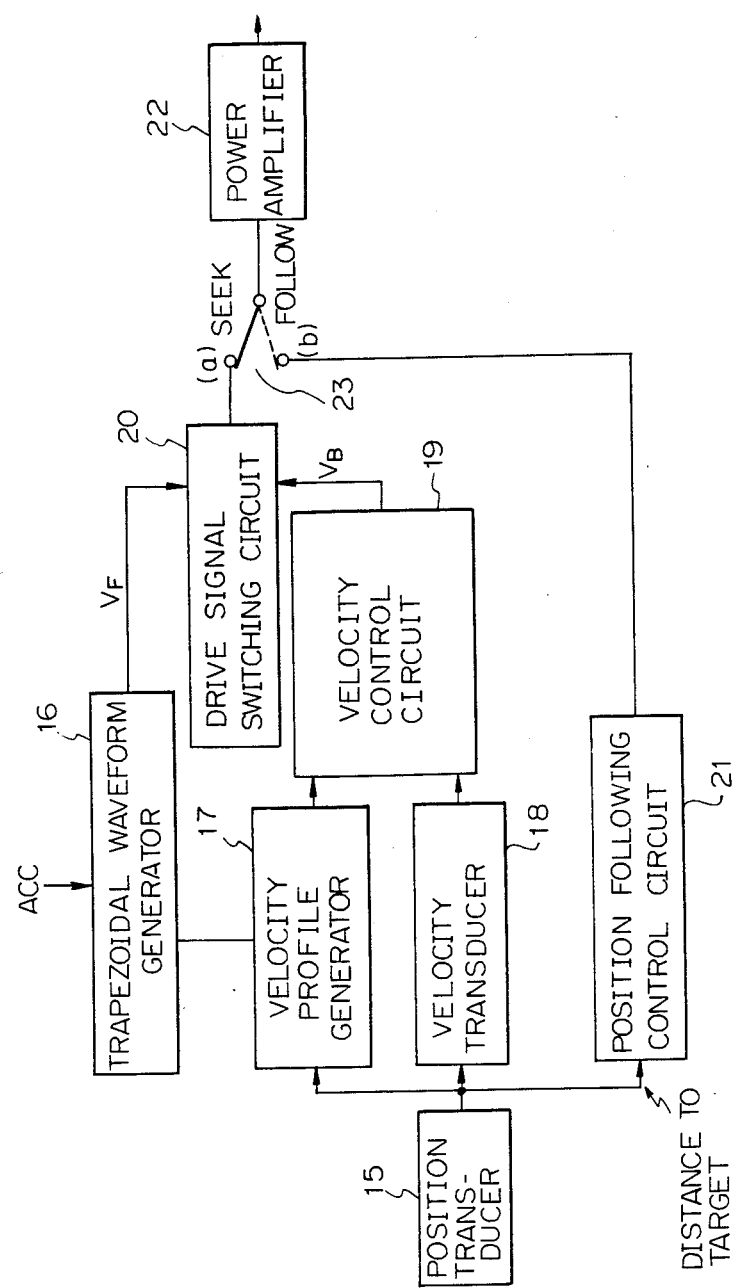

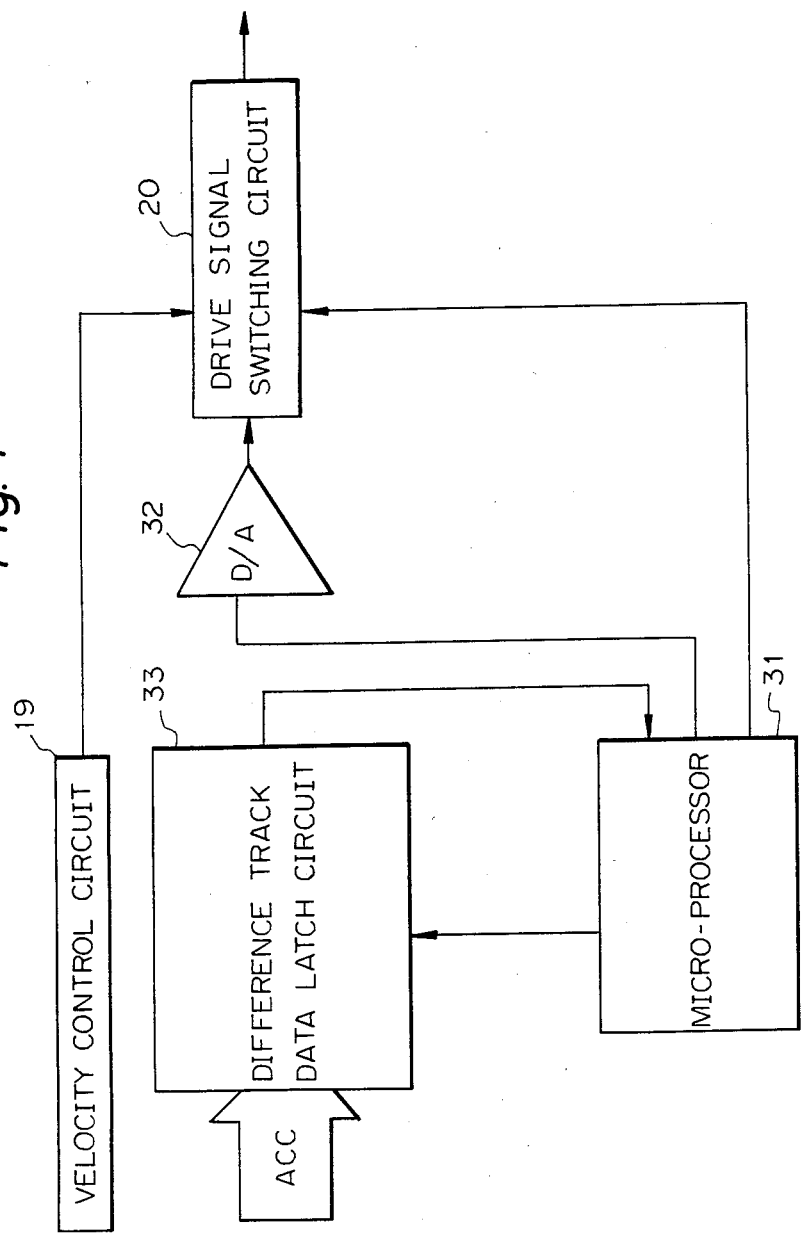

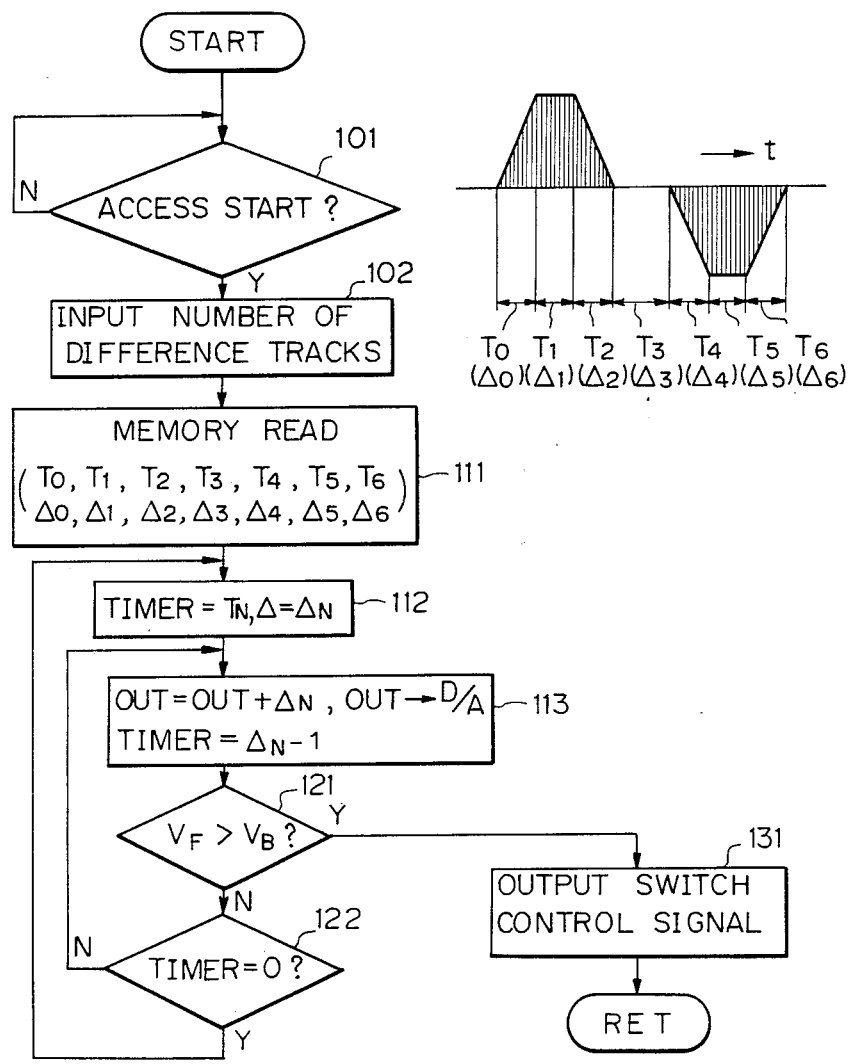

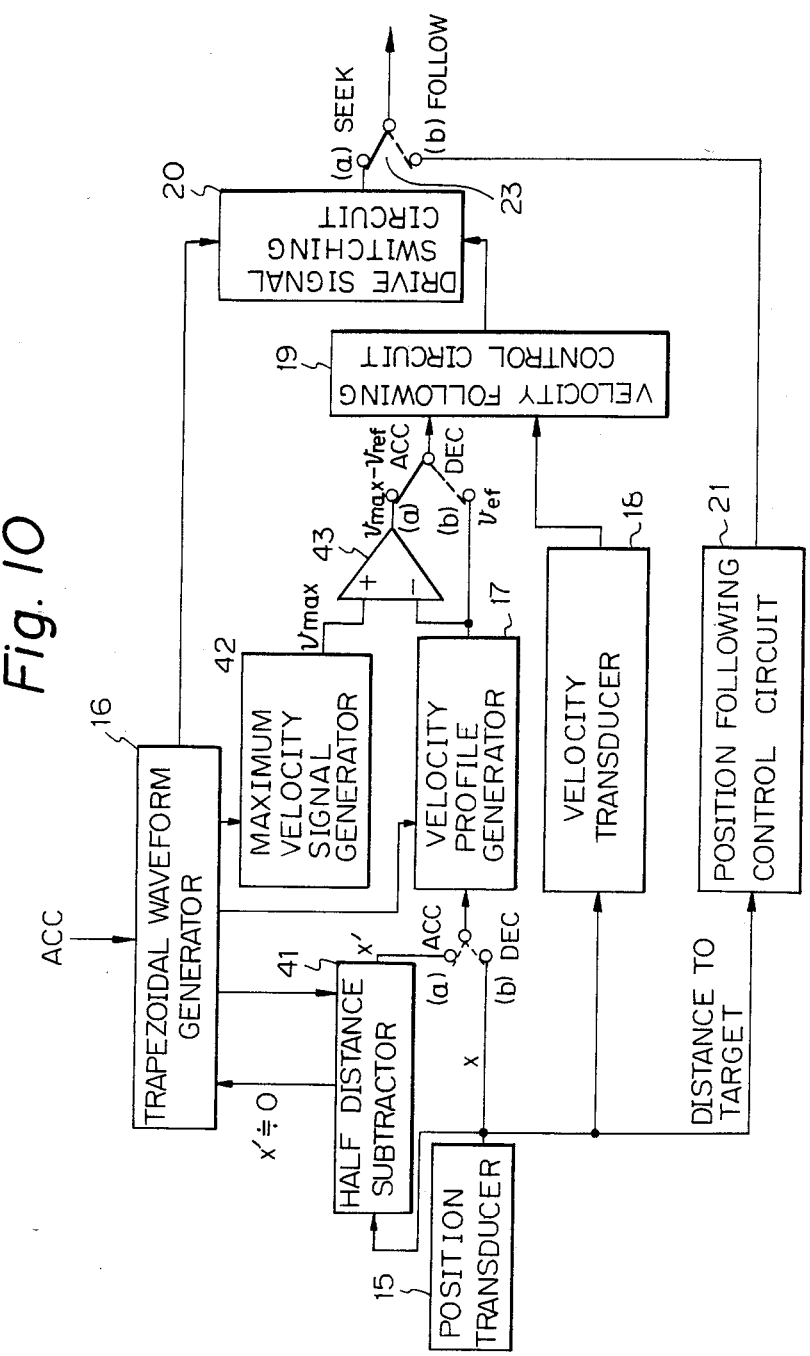

4,796,112

ACTUATOR ACCESS CONTROL SYSTEM FOR A MAGNETIC HEAD USING TRAPEZOIDAL DRIVE CURRENT

BACKGROUND OF THE INVENTION

The present invention relates to an access control system of an actuator for fast positioning of an actuator which carries a plurality of magnetic heads in a magnetic disk storage/memory system.

In a large capacity magnetic disk storage for an on-line system, throughput must be increased so that the larger storage capacity of the hardware is used effectively.

A multi-actuator has a plurality of actuators each of which independently carries magnetic heads so that the storage for each actuator is reduced by divided actuators, and results in high speed access. Therefore, a multi-actuator considerably increases the throughput of the system.

However, a multi-actuator has a problem in that mechanical power applied to an active actuator is undesirably transferred to an adjacent actuator through mechanical parts of a head disk assembly, and disturbs the accurate tacking in the adjacent actuator. That disturbance would break the positioning of the adjacent actuator and cause a positioning error in adjacent actuators. Therefore, it is important to reduce the positioning error caused by interaction in an HDS (Head Disk Assembly) which employs a multi-actuator.

FIG. 18 shows a perspective view of a swing type multi-actuator which has two actuators. In the figure, the numeral 1 is an actuator, 2 is a pivot shaft, 3 is a magnet housing, and 4 is a sub-base support. The two actuators 1 are mechanically coupled with each other through the pivot shaft 2, the magnet housing 3, and the sub-base support 4. Therefore, mechanical vibration from one actuator is induced to another actuator through the mechanical coupling parts (pivot shaft, magnet housing, and sub-base support), and thus the transferred vibration can cause a positioning error of another actuator.

The above mechanical vibration has a frequency spectrum between several hundred Hz and several thousand Hz. Since the cutoff frequency in a servo loop for head positioning is usually several hundred Hz, which is less than one seventh of the mechanical resonance frequency of the actuator 1, the servo loop circuit can not make the actuator follow the transferred mechanical vibration, and therefore, the transferred undesired mechanical vibration directly causes a head positioning error.

A prior art for solving the above problem is to decrease the slewing rate (gradient) of the drive current in an actuator 1 so that the current has no spectrum close to the mechanical resonance frequency.

The prior art to decrease slewing rate has the advantages that the positioning servo loop is stable, and the circuit is simple.

However, the prior art has the disadvantages that the drive current or the power supply voltage must be large since the waveform of the drive current must be triangular in high velocity operation, and that the temperature of a head disk assembly is considerably increased due to large power consumption in a voice coil motor (VCM) and an amplifier which feeds current to the VCM.

SUMMARY OF THE INVENTION

It is an object, therefore, of the present invention to overcome the disadvantages and limitations of a prior actuator access control system by providing a new and improved actuator access control system.

It is also an object of the present invention to provide a fast and accurate head positioning system which does not suffer from unwanted mechanical interaction.

The above and other objects are attained by an actuator access control system for positioning an actuator which carries a magnetic head to a desired track by the drive current being a pair of trapezoidal waveform currents with opposite polarities, a waveform factor which is the ratio of the upper side and lower side of the trapezoidal waveform being in a range between 0.1 and 0.4, depending upon a seek stroke, so that the mechanical resonance frequency of the actuator coincides with the frequency at which no power spectrum of the trapezoidal waveform resides.

BRIEF DESCRIPTION OF THE DRAWINGS

The foregoing and other objects, features, and attendant advantages of the present invention will be appreciated as the same become better understood by means of the following description and accompanying drawings wherein;

FIG. 1A shows a trapezoidal waveform used in the present invention,

FIG. 1B shows a power spectrum of the waveform of FIG. 1A,

FIG. 4A shows curves of power spectra of drive current for each value of ($\gamma$) which is equal to $T_O/T_{ACC}$, FIG. 6 is a block diagram of the actuator control circuit according to the present invention, FIG. 7 is a block diagram of a feed forward velocity control signal generator circuit according to the present invention, FIGS. 8A and 8B show flow chart for generating trapezoidal waveform, and trapezoidal waveform to be generated, respectively, FIG. 10 is a block diagram of the second embodiment of the actuator access control circuit according to the present invention.

DESCRIPTION OF THE PREFERRED EMBODIMENTS

Figure 18:
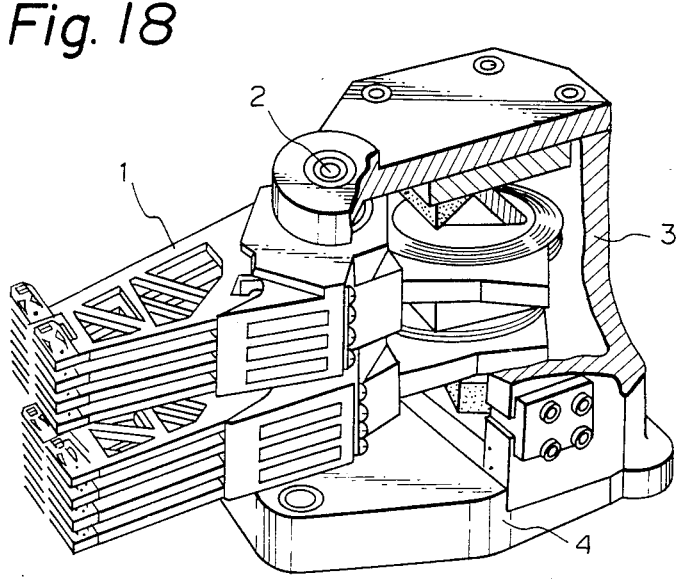
FIG. 18 is a swing type positioner with two actuators for use in the present invention.

The mechanical transfer function of a head positioning mechanism of FIG. 18 which has two actuators is shown by the following equation:

$$\begin{pmatrix} E_1 \\ E_2 \end{pmatrix} = \begin{pmatrix} G_{11} & G_{12} \\ G_{21} & G_{22} \end{pmatrix} \times \begin{pmatrix} F_1 \\ F_2 \end{pmatrix} \quad (1)$$

where; $E_i$ is the relative displacement of between a head i and a desired track (i=1 or 2), Fi is a drive power for an actuator i, and $G_{11}$, $G_{12}$, $G_{21}$ and $G_{22}$ are compliances which correspond to a transfer function of positioning system. It should be noted in FIG. 18 which has a common pivot shaft 2 for two actuators 1, the mutual compliances $G_{12}$ and $G_{21}$ are affected considerably by the bending resonance of the pivot shaft 2.

Although the reduction of the mutual compliances $G_{12}$ and $G_{21}$ in the mechanical design is effective to reduce interaction of multi-actuators, there is a limitation for reducing vibration by only mechanical design and/or mechanical parts.

The present inventors found in equation (1) that the interaction between actuators depends upon the product of mutual compliance and drive power ($G_{12}F_2$, $G_{21}F_1$). Therefore, even if the mutual compliances $G_{12}$ and $G_{21}$ are large, the interaction may be small or zero when the spectrum of the drive powers $F_1$ and $F_2$ are small, or zero.

In other words, a pair of trapezoidal drive currents for acceleration and deceleration can suppress a spectrum close to the mechanical resonance frequency of mutual compliances $G_{12}$ and $G_{21}$, and higher frequency. Thus, the trapezoidal drive current can provide accurate and stable positioning of a head, and the magnitude of the mutual interaction can be adjusted by controlling the shape of the trapezoidal waveform. In the trapezoidal driving current, the less mutual interaction, the more the power consumption in a drive coil of an actuator increases, therefore, the problem of the power consumption must be considered.

FIG. 1A shows trapezoidal waveforms. A pair of trapezoidal waveforms with opposite polarities as shown in FIG. 1 are defined by a waveform factor ($\gamma$, $\delta$), and the power spectrum of drive current in an actuator, and power consumption in a drive coil for each form factor are considered. The waveform factor is defined as follows:

$\gamma = T_{CON}/T_{ACC}$ $\delta = T_O/T_{ACC}$ \quad (2)

where ($\gamma$, $\delta$) is the factor of trapezoidal waveform, $T_{ACC}$ is the time of acceleration or deceleration (bottom side of trapezoidal waveform), $T_{CON}$ is the time of constant acceleration (deceleration) (upper side of trapezoidal waveform), and $T_O$ is the time of constant velocity between acceleration and deceleration (drive current is zero).

FIG. 1B shows a power spectrum of the trapezoidal waveform of FIG. 1A. As shown in FIG. 1B, there are some characteristic frequencies ($f_1$, $f_2$, $f_3$...) where no power spectrum exists, or at least the power spectrum is very small. Therefore, when the mechanical resonance frequency of the actuator coincides with one of said characteristic frequencies, the mechanical interaction is suppressed. It should be noted that a prior art can not have any characteristic frequencies such as $f_1$, $f_2$, $f_3$... so that a prior actuator must provide high mechanical resonance frequency. On the other hand, a feature of the mechanical resonance frequency of an actuator according to the present invention resides in the range where the power spectrum of the drive current exists, and it coincides with the frequency at which the power spectrum is a minimum.

Figure 2:
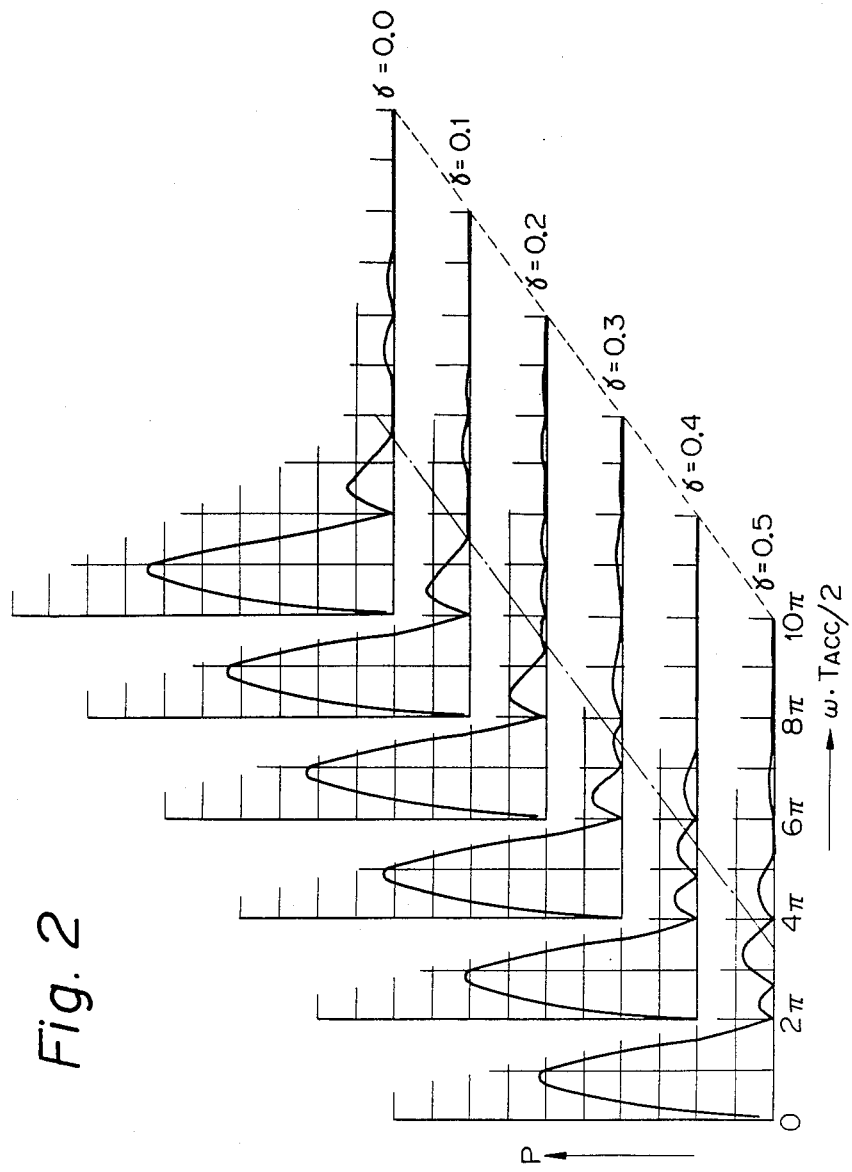
FIG. 2 shows power spectra of drive current for each value of waveform factor ($\gamma$)

FIG. 2 shows power spectra of the drive current when a actuator 1 moves a predetermined length in a predetermined time for the value ($\gamma$) between 0.0 and 0.5, where ($\delta$) is zero. The waveform factor (0, 0) is the same as a triangular drive current by a prior slewing rate restriction method, and the waveform factor (1, 1) is the same as a conventional Bang-Bang control which uses a rectangular waveform.

It should be appreciated in FIG. 2 that when the waveform changes from ($\gamma=1.0$) which is a rectangular waveform to ($\gamma=0.0$) which is triangular waveform, the power spectra P decreases at the frequency higher than the normalized frequency $\omega T_{ACC}/2=3.5$ $\lambda$ when ($\gamma$) is larger than 0.2. On the other hand, when ($\gamma$) is smaller than 0.2, the high frequency power spectrum P increases again as the value ($\gamma$) decreases. Accordingly, it is desirable to select the value ($\gamma$) between 0.1 and 0.4, preferably ($\gamma$)=0.2, in view of the suppression of interaction. In other words, when $\omega T_{ACC}$ is higher than 3.5 $\pi$, the power spectrum is smallest when $\gamma=0.2$.

Figure 3:
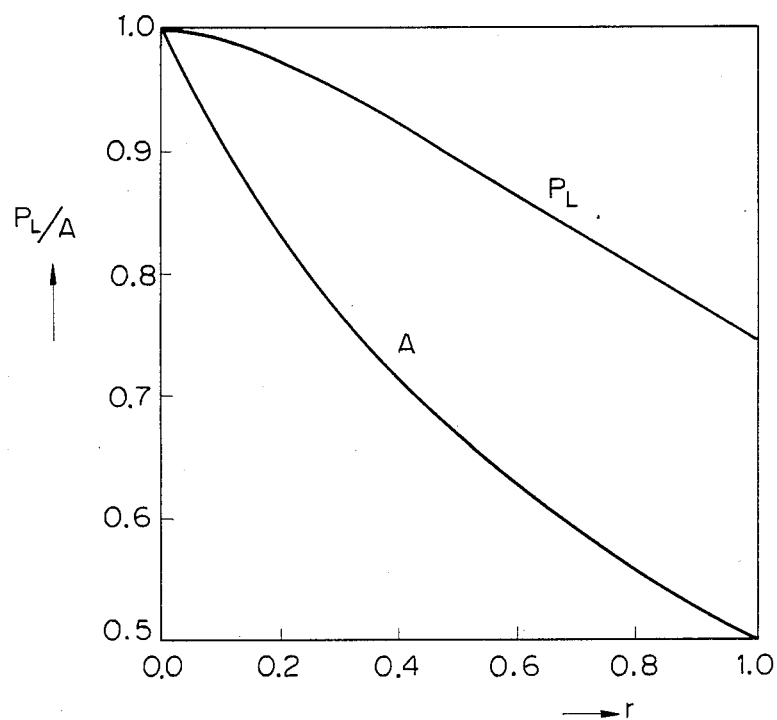
FIG. 3 shows curves of power consumption in a drive coil and amplitude of drive current for each value ($\gamma$) which is the ration of the upper base and bottom base of trapezoid.

FIG. 3 shows dependencies of the amplitude A of the drive current and the power consumption $P_L$ in a drive coil on the value ($\gamma$). As shown in FIG. 3, the larger the value ($\gamma$) is, the smaller the amplitude A and the power consumption $P_L$ are. Therefore, when there is a margin in preventing mechanical interaction, it is preferable to use a trapezoidal waveform which has the value ($\gamma$) larger than 0.2.

FIG. 4A shows the distribution of power spectrum of drive current when a constant velocity duration in which no drive current flows between the acceleration period and deceleration period, is provided. In other words, FIG. 4A shows the curves of the power spectrum of drive current based upon FIGS. 2 and 3 on the condition that the value ($\gamma$) and the amplitude A do not change, but only the value ($\delta$) is changed.

Figure 4B:
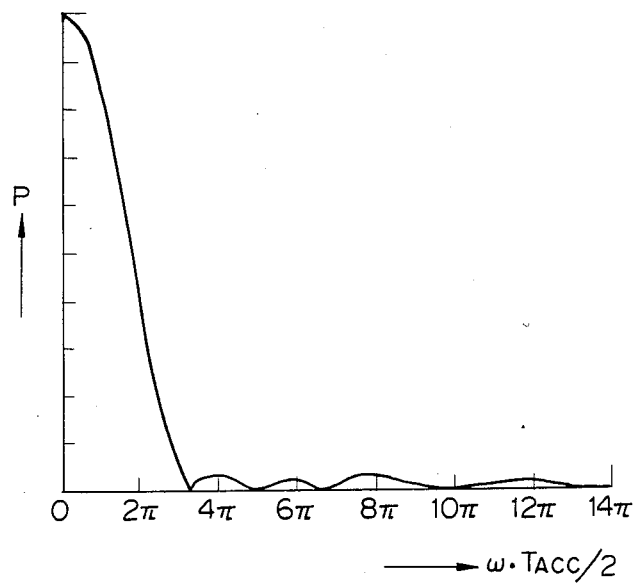
FIG. 4B shows an envelope of the power spectrum of FIG. 4A.
Figure 4C:
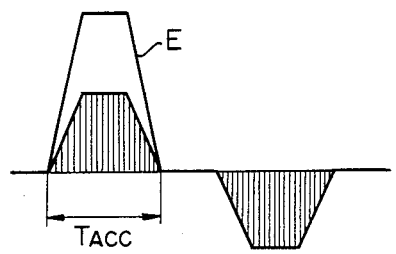
FIG 4C shows a trapezoidal waveform for the explanation of FIGS. 4A and 4B, FIGS. 5A, 5B and 5C show trapezoidal drive current for each seek stroke.

The envelopes of the power spectra of FIG. 4A are included in the envelope of FIG. 4B, which is the envelope of the power spectra of positive trapezoidal waveform E in FIG. 4C. The waveform E is an isolated (positive) waveform having the amplitudee twice as high as that of a pair of trapezoidal waveforms. The envelope of FIG. 4B depends only upon the value ($\gamma$) and the acceleration time $T_{ACC}$, but is independent of the value ($\gamma$).

Therefore, when a constant velocity region is provided, the maximum magnitude of a mechanical interaction is defined by the shape of the acceleration current, but is independent from the seek stroke.

Therefore, when there is a margin in mechanical interaction and seek time, it is preferable to use a trapezoidal waveform with the value ($\gamma$) larger than 0.2, and to use constant velocity duration ($\delta > 0$), so that power consumption in a drive coil is considerably reduced.

In view of the above analysis, the present invention has (1) in a short track access in which acceleration time $T_{ACC}$ is short, and fundamental spectra of the drive current is in a high frequency region, a trapezoidal waveform with the value ($\gamma$) nearly equal to 0.2 is used so that mechanical interaction is suppressed; (2) in a middle and/or long stroke seek in which acceleration time $T_{ACC}$ is relatively long, and there is a margin for suppressing mechanical interaction, a trapezoidal waveform with the value ($\gamma$) larger than 0.2, and the value ($\delta$) larger than 0 is used so that the magnitude of mechanical interaction is similar to that in a short stroke seek, and the waveform factor ($\gamma$, $\delta$) is determined for each seek length so that the average power consumption in a drive coil is minimized.

Figure 5A:
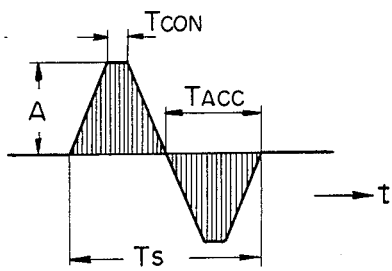
Figure 5B:
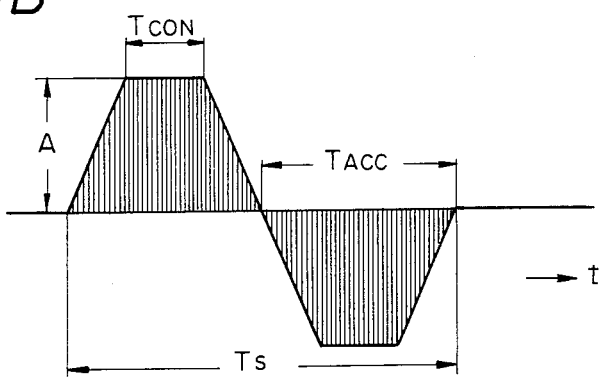
Figure 5C:
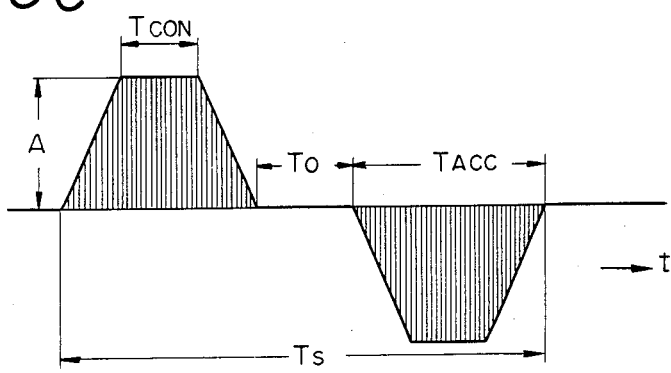

FIG. 5 shows the waveform in each case, wherein FIG. 5A shows a short stroke seek, where ($\gamma$)=0.2, and ($\delta$)=0; FIG. 5B shows a middle stroke seek, where ($\gamma$)>0.2, and ($\delta$)=0; and FIG. 5C shows a long stroke seek, where ($\gamma$)>0.2, and ($\delta$)$\neq$0.

In a short stroke seek of FIG. 5A, the acceleration time $T_{ACC}$ is short, and the drive current includes much high frequency spectra. However, as the seek stroke is short and the amplitude A of the drive current is small, the power consumption is small, and therefore, the waveform factor ($\gamma$, $\delta$) which is effective to suppress mechanical interaction, does not cause excess heating.

In a middle stroke seek in FIG. 5B, the seek stroke is longer and the acceleration time $T_{ACC}$ of an actuator 1 is longer, therefore, there is a margin for suppressing mechanical interaction. However, since the probability of middle stroke seek is relatively large, the requirement for the seek time and the power consumption in a drive coil is severe. Therefore, the waveform factor ($\gamma > 2$, $\delta = 0$) is used, so that a high speed access is obtained, and the power consumption in a drive coil is reduced to reduce heat generation in an HDA (Head Disk Assembly). When ($\gamma$) is larger than 0.2, the amplitude A of the drive current may be small as shown in FIG. 4, the power supply voltage and the power consumption in a drive amplifier are also reduced.

In a long stroke seek region in FIG. 5C, the acceleration time $T_{ACC}$ of an actuator 1 is long, the fundamental component of the spectra of drive current resides only in a low frequency region, the magnitude of the mechanical interaction is not large, and the probability of the access is not large. Therefore, when the constant velocity region is provided ($\delta = 0$), the average seek time does not increase so much. Therefore, the waveform factor ($\gamma > 0.2$, $\gamma > 0$) is used to save power consumption. The presence of the constant velocity region reduces the maximum velocity at the access time, and reduces the shock to a head positioning mechanism in a runaway.

It should be noted that the effect of the present invention operates also to the transfer functions $G_{11}$ and $G_{22}$ of an accessed actuator 1 itself in the equation (1), therefore, the vibration of an accessed actuator is also suppressed. Thus, a smooth actuator operation is accomplished. Thus, the present invention is effective not only to suppress interaction, but also to provide stable control of an actuator itself.

FIG. 6 is a block diagram of the access control circuit according to the present invention. In the figure, the numeral 15 is a position transducer, 16 is a trapezoidal waveform generator, 17 is a deceleration velocity profile generator, 18 is a velocity transducer, 19 is a velocity control circuit, 20 is a drive signal switching circuit, 21 is a position following control circuit, and 22 is a power amplifier.

The trapezoidal waveform generator 16 is shown in FIG. 7, in which the numeral 31 is a micro-processor, 32 is a D/A (digital to analog) converter, and 33 is a difference track data latch circuit.

The operation of the micro-processor 31 is shown in the flow-chart in FIG. 8, in which an acceleration signal and a deceleration signal which is the same waveform as that of the acceleration signal and in the opposite polarity, are generated according to the seek stroke so that the actuator 1 is moved to the desired track.

The power amplifier 22 is a current control type amplifier which is not affected by the voltage fluctuation of a power supply, and the change of resistance of a drive coil due to change of temperature, so that the feed forward velocity control by the trapezoidal signals is stably carried out.

However, a little control error is inevitable due to an external disturbance and the change of the torque constant of the actuator 1 during feed forward velocity control.

Figure 9:
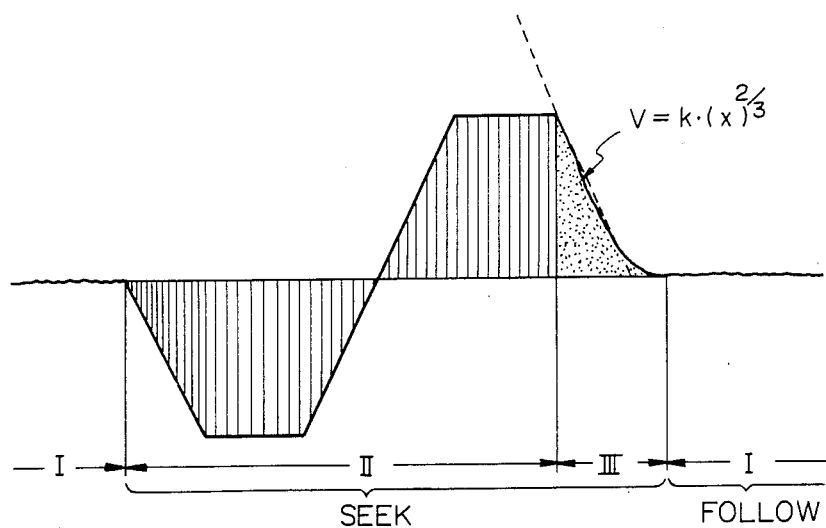
FIG. 9 shows waveform of drive current by feed forward velocity control and feedback velocity control.

In order to solve the above problem, as shown in FIG. 9, the seek time which is between the track following periods (I), is divided to the feed forward velocity control period (II), and the feed back velocity control period (III) which is about 20–30 percent of the total of the periods of (II) and (III). The period (III) functions to decelerate the actuator 1 to position the same at the desired position and remove the control error in the period (II). For that purpose, the trapezoidal waveform generator 16 and the velocity control circuit 19 which generates a drive signal for following the actuator 1 to the deceleration reference velocity profile, operate at the same time. And, when the output of the trapezoidal signal exceeds the output of the velocity control circuit 19, the drive signal switching circuit 20 switches the drive signal from the trapezoidal waveform from the circuit 16 to the feedback control signal from the circuit 19.

When the deceleration reference velocity profile generator 17 sets the velocity profile $V = k \cdot (x)^{\frac{1}{2}}$ in which the deceleration drive signal almost decreases linearly for the object position, the actuator may be decelerated accurately by keeping the drive signal trapezoidal.

The deceleration reference velocity profile generator 17 may be omitted for the simplification of the circuit, since the sensitivity of the interaction suppression control by the trapezoidal signal is low concerning the change of the control parameters. When it is omitted, the position error (distance to target) is taken as the deceleration reference velocity.

The position following control circuit 21 functions to follow the actuator 1 to the object position, after the actuator 1 reaches the object position by the feed forward velocity control, and the switch 23 is switched to the contact (b).

Now, the operation of FIG. 8 is described. The trapezoidal waveform is divided by the time durations $T_0$ through $T_6$ as shown in FIG. 8A according to the change points of the amplitude of the signal, and the incremental value (or decremental value) $\Delta_1$ through $\Delta_6$ at each change point is stored in the memory table of the memory of the micro-processor 31.

When the access command ACC (FIG. 7) states how many tracks the actuator should seek, that command ACC is stored in the latch circuit 33 according to the instruction by the microprocessor 31. Then, the status 101 (seek start?) changes to y (yes). Then, in the step 102, the number of difference tracks is loaded by the micro-processor 31. In the step 111, the table data, $T_0$ through $T_6$, and $\Delta_0$ through $\Delta_6$ are loaded into the micro-processor 31. In the step 112, the timer and the output register are set to the n'th time duration ($T_N$), and n'th incremental value ($\Delta_N$). In the step 113, $\Delta_N$ is accumulated (OUT=OUT+$\Delta_N$), the accumulated sums sent to the D/A converter 32 (OUT→D/A), and the content of the timer is updated by subtracting 1 (timer=$\Delta_N$−1). In the step 121, the feed forward control output $V_F$ is compared with the feed back control output $V_B$. When the output of the step 121 is N (no), and the content of the timer is not zero (step 122), the steps 113, 121 and 122 are repeated.

When the output of the step 122 is Y (yes) in which the timer becomes zero, the steps 112, 113, 121 and 122 are repeated so that the process for the next time slot $T_{i+1}$ is carried out.

When the output of the step 121 becomes Y (yes), the step 132 sends the switch control signal so that the switch 19 is switched to the contact (b) (feedback control). Then the control returns to the step 101.

As mentioned above, a micro-processor can generate any desired trapezoidal waveform so that the optimum trapezoidal waveform depending upon the mechanical resonance frequency is obtained.

The present invention is also applicable to a digital positioning control, in which the accurate detection of location is possible. The present invention uses a feed forward control which is implemented by addition/subtraction for the most portion of the control, and a feedback control when the speed of an actuator 1 reaches about one fifth of the maximum velocity. Therefore, the necessary signal processing speed for the access control circuit is considerably reduced.

Further, a time divisional multiple control of actuators is possible in the present invention.

FIG. 10 is a block diagram of the second embodiment of control circuit according to the present invention. In the figure, the numeral 41 is a half distance subtractor, 42 is a maximum velocity signal generator, 43 is an analog adder. The maximum velocity signal generator 42 is implemented by a memory which provides the maximum reference velocity of an actuator according to the seek stroke. The half distance subtractor 41 provides the remaining seek stroke until the ½ seek stroke.

Figure 11:
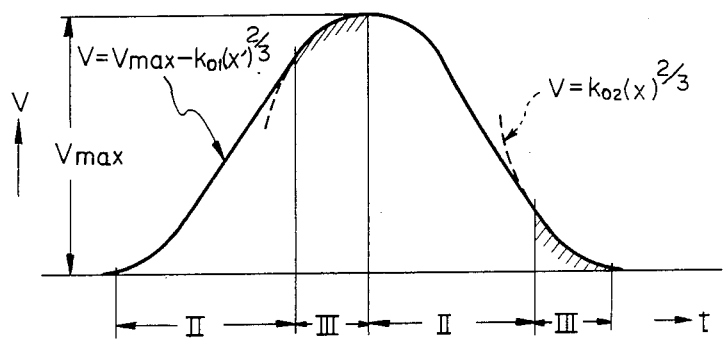
FIG. 11 is a waveform of velocity profile in FIG. 10.

The embodiment of FIG. 10 uses the symmetrical nature of the trapezoidal waveform. The circuit of FIG. 10 provides the reference velocity profile $V = V_{max} - k \cdot 0.1(x')^{\frac{2}{3}}$ (where x' is the remaining seek stroke until ½ seek stroke), and $V = k \cdot 0.2(x)^{\frac{2}{3}}$ (where x is the remaining stroke to the object position), as shown in FIG. 11. In the embodiment of FIG. 10, a feedback control is used in both the acceleration step and deceleration step of an actuator 1.

When a constant velocity step in which no drive current is provided in a long seek stroke operation is involved, the half distance subtractor 41 provides the remaining stroke up to the starting point of the constant velocity control.

The embodiment of FIG. 10 has the feature that the control error of an actuator is compensated during the acceleration step, therefore, the influence by an external disturbance is reduced.

Figure 12:
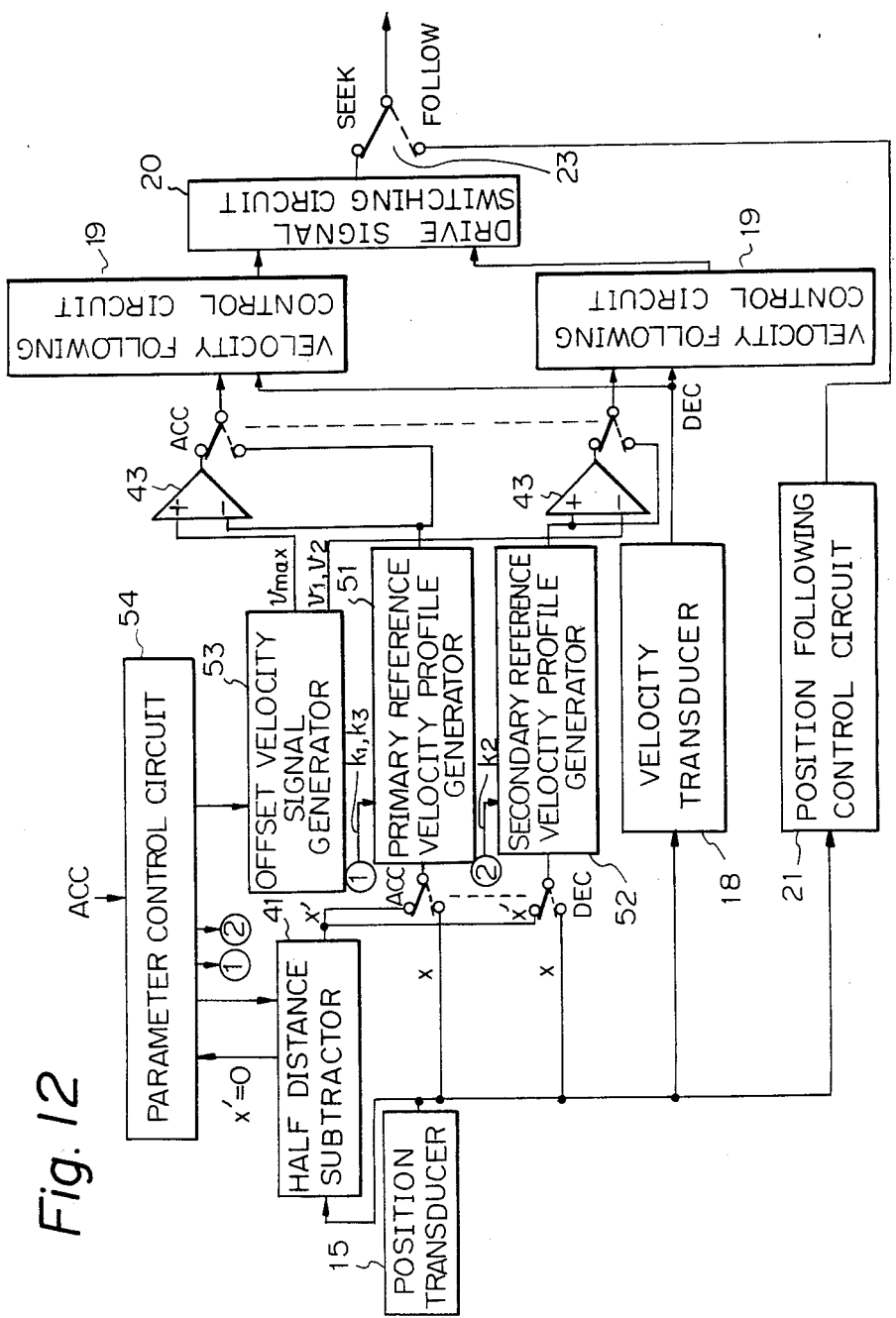
FIG. 12 is a block diagram of the third embodiment of the actuator access control circuit according to the present invention.

FIG. 12 is a block diagram of the third embodiment of the access control circuit according to the present invention. In the figure, the numeral 51 is a primary reference velocity profile generator, 52 is a secondary reference velocity profile generator, 53 is an offset velocity signal generator, and 54 is a parameter control circuit.

Figure 13:
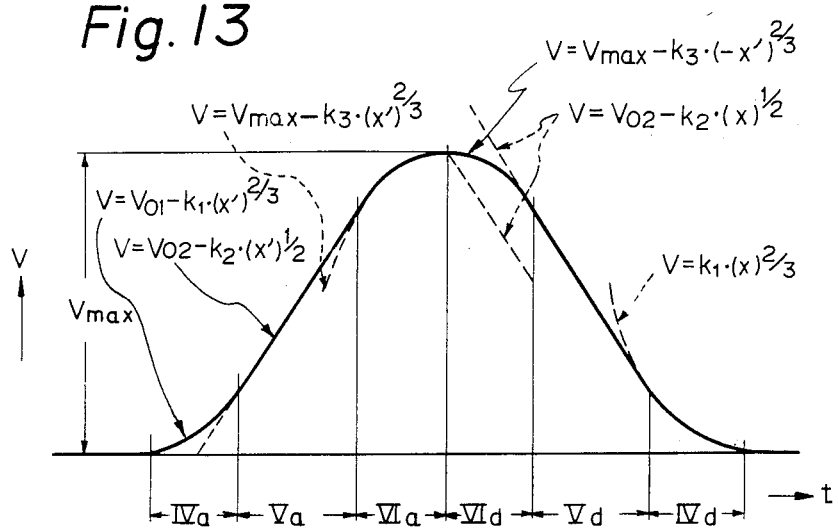
FIG. 13 is a velocity profile of FIG. 12.

The embodiment of FIG. 12 has a pair of reference velocity profile generators 51 and 52 which are not provided in the embodiment of FIG. 10. Generators 51 and 52 generate the exponential function signals as shown in the reference velocity profile of FIG. 13.

When the actuator is accelerated in the control period $IV_a$, the velocity reference signal $V = V_{01} - k_1(x')^{\frac{2}{3}}$ is generated by the primary generence velocity profile generator 51 and the offset velocity signal generator 53, depending upon the remaining length X' to ½ seek stroke.

Further in the control period $V_a$, the secondary reference velocity profile generator 52 and the offset velocity signal generator 53 provide $V = V_{02} - k_2(x')^{\frac{2}{3}}$, and the control period $VI_a$, the primary reference velocity profile generator 51 and the offset velocity signal generator 53 provide the velocity reference signal $V = V_{max} - k_3(x')^{\frac{2}{3}}$.

In the deceleration period, the remaining length X' to ½ seek stroke is replaced by the remaining length X to the object track, and the velocity reference signal is generated in the sequence of the control periods $VI_d$, $V_d$, $IV_d$, in the opposite steps of the acceleration period.

The switching of the velocity reference generator, or the control period, is accomplished by the switching circuit 20, when the outputs of each of the velocity reference generators coincide with each other.

The control parameters for the above operations are provided by the parameter control circuit 54, which may be similar to that of FIG. 7.

The embodiment of FIG. 12 has the feature that the circuit structure is similar to that of a conventional access control circuit, and that the trapezoidal waveform control is accomplished with the stable operation without being affected by an external disturbance.

Figure 14:
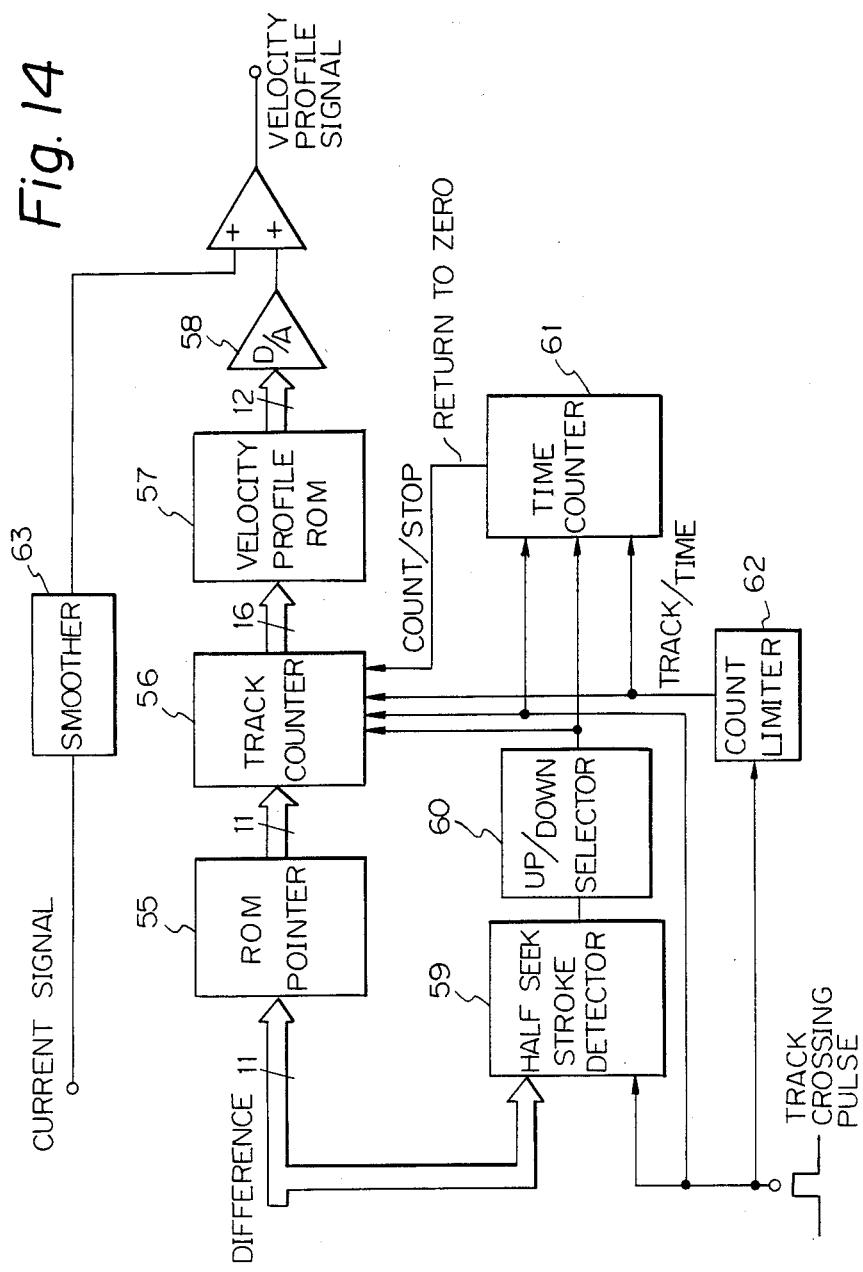
FIG. 14 shows a block diagram of still another embodiment according to the present invention.

FIG. 14 shows the fourth embodiment. The circuit of FIG. 14 generates the velocity reference signal which causes trapezoidal drive current to flow in the VCM. In the figure, the numeral 55 is a ROM pointer, 56 is a track counter, 57 is a velocity profile generator, 58 is a D/A converter, 59 is a half seek stroke detector, 60 is an up/down selector, 61 is a time counter, 62 is a count limiter, and 63 is a smoother.

Figure 15:
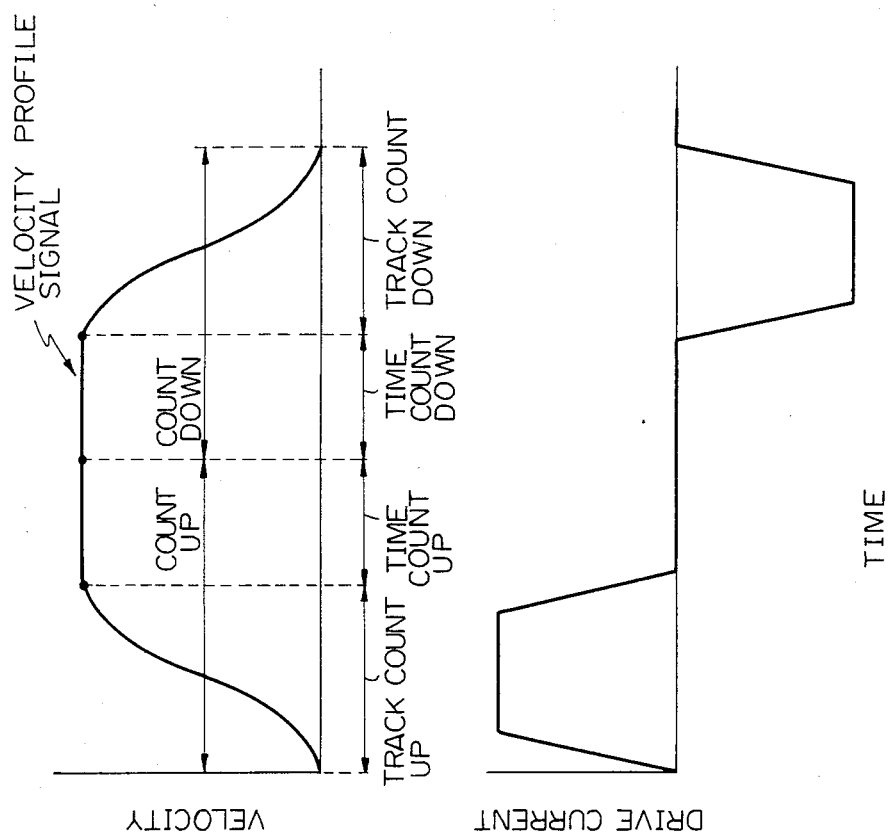
FIG. 15 shows the operation of the apparatus of FIG. 14.

FIG. 15 shows the operation and the waveforms of the circuit of FIG. 14. The velocity profile generator 57 stores the velocity reference signal according to the seek stroke, and the storage location of each velocity reference signal is indicated by the ROM pointer 55. When the seek operation begins, the track crossing pulse, provided when a head crosses a track boundary, increments the track counter 56, and the velocity profile generator 57 provides the velocity reference signal in sequence. The counter limiter 62 operates also. The count limiter 62 functions to detect that the velocity reference signal reaches the maximum value ($V_{max}$). When the count limiter 62 provides an output, the track counter 56 stops, and instead, the time counter 61 begins to be incremented until the half seek stroke detector 59 recognizes that a head reaches ½ seek stroke. Thus, the velocity reference signal in the acceleration period is generated.

When the ½ seek stroke detector 59 recognizes that the head reaches the ½ seek stroke, the deceleration operation begins. In the deceleration period, the velocity reference signal is generated in an opposite manner from that of the acceleration period, and the time counter 61 is decremented until it reaches zero. When time counter 61 reaches zero, the track counter 56 becomes active. At that time, the track counter 56 is selected to be in the count down mode by the ½ seek stroke detector 59 and the up/down selector 60. The velocity reference signal is generated by decrementing the track counter 56.

The smoother 63 functions to smooth the stepwise velocity reference signal by the integration of the drive current.

Figure 16:
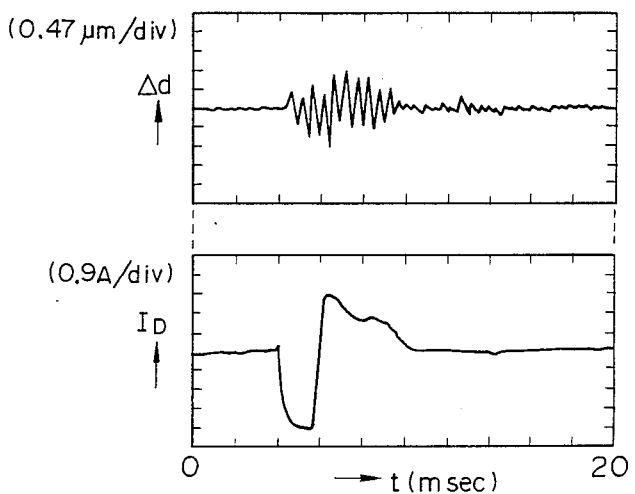
FIG. 16 shows an example of characteristics of a head positioning error in a prior art.
Figure 17A:
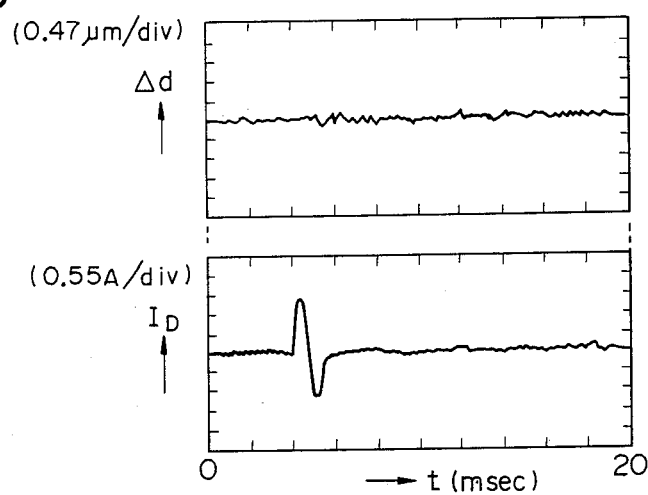
FIGS. 17A, 17B and 17C show an example of characteristics of a head positioning error according to the present invention.
Figure 17B:
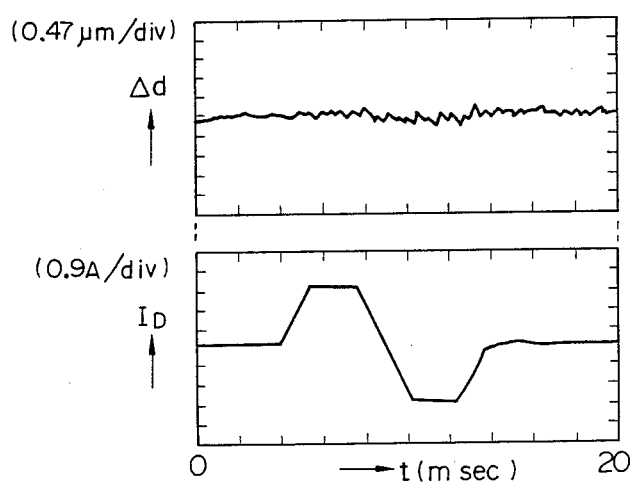
Figure 17C:
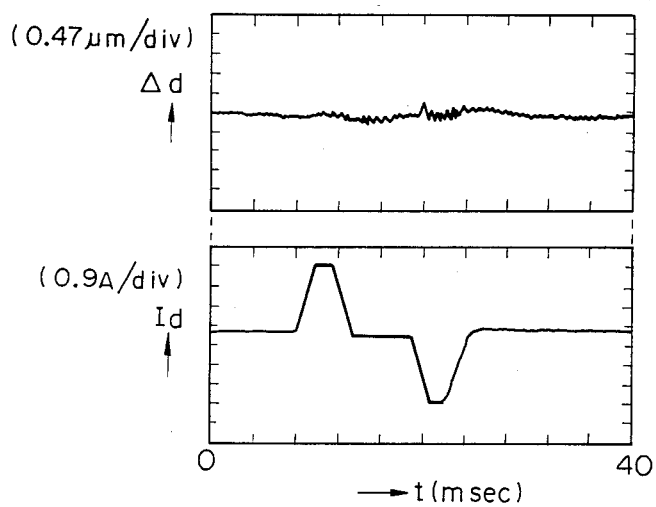

FIGS. 16 and 17 show the seek operation characteristics of the two swing type actuators. Those show the waveform $I_D$ of the drive current, and the head positioning error $\Delta_D$ by mechanical vibration interaction, when another actuator is driven. FIG. 16 shows the conventional case in which the track seek with the maximum interaction is executed. FIG. 17A shows the short seek stroke operation according to the present invention, FIG. 17B shows the middle seek stroke operation according to the present invention, and FIG. 17C shows the long seek stroke operation according to the present invention.

It should be noted in those figures that the head positioning error by interaction is suppressed by more than 15 dB. Further, the present invention provides faster and more accurate position control of an actuator.

It is a matter of course that some modifications in the embodiments are possible to those skilled in the art. For instance, a waveform factor ($\gamma$) is possible between 0.1 and 0.4.

As described above in detail, according to the present invention, an actuator is controlled in the seek operation by a trapezoidal waveform current, and the unwanted mechanical interaction is considerably suppressed. Further, since the mechanical resonance of an actuator itself is suppressed, the high speed positioning of an actuator is also achieved. Further, by using the present invention, the track density of magnetic disk storage is considerably increased.

Therefore, the present invention is applicable not only to a multi-actuator system, but also a single actuator system.

From the foregoing, it will now be apparent that a new and improved access control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An actuator access control system for positioning an actuator which carries a magnetic head to a desired track by flowing drive current into the VCM of the actuator,
   wherein the improvement comprises in that said drive current is a pair of trapezoidal waveform signals in opposite polarities, and that waveform factor which is ratio of upper side and bottom side of said trapezoidal waveform is dependent upon seek stroke, so that mechanical resonance frequency of the actuator coincides with frequency at which no or less power spectrum of said trapezoidal waveform resides.

2. An actuator access control system according to claim 1, wherein said actuator is a multi-actuator having a plurality of actuators on one HDA (Head Disk Assembly).

3. An actuator access control system according to claim 1, wherein said pair of trapezoidal currents are the same as each other.

4. An actuator access control system according to claim 1, wherein there is a duration with no current in the coil, between first trapezoidal current and second trapezoidal current.

5. An actuator access control system according to claim 1, wherein said waveform factor ($\gamma$) depends upon seek stroke so that the factor is the larger, the longer the seek stroke is.

6. An actuator access control system according to claim 4, wherein said duration with no current depends upon seek stroke so that the longer the duration is, the longer the seek stroke is.

7. An actuator access control system (FIG. 6) comprising
   a trapezoidal waveform signal generator (16) having a memory table which stores data for defining the waveform depending upon seek stroke,
   means (15) for detecting the location of the actuator,
   a velocity detector (18) coupled with said means (15),
   a velocity profile generator (17),
   a velocity control circuit (19) for following speed of the actuator to output of said speed profile generator (17),
   a switch (20) which passes at first output of said trapezoidal waveform generator (16), and switches to output of said velocity control circuit (19) when the former exceeds that latter, and
   a power amplifier (22) of current control type coupled with output of said switch (20) to drive a VCM of the actuator.

8. An actuator access control system according to claim 7, wherein said velocity profile generator is an exponential function generator.

9. An actuator access control system (FIG. 12) comprising the primary and secondary reference velocity profile generators (51,52) coupled with a parameter control circuit (54) having a memory table which stores data for defining the reference velocity profile depending upon seek stroke,
   means (15) for detecting the location of the actuator,
   a velocity detector (18) coupled with said means (15),
   a velocity control circuit (19) for following velocity of the actuator to output of said reference velocity profile generators (51,52),
   an offset velocity signal generator (53) coupled with said generators (51,52),
   a half distance subtractor (41) for providing a remaining seek stroke until ½ seek stroke,
   a switch (20) which passes at first the output of the said primary reference velocity profile generator (51), and switches to the output of the said secondary reference velocity profile generator (52) when the both outputs coincide with together, and switches to the output of the said primary reference velocity profile generator (51), and after passing by ½ seek stroke, previous switching sequence is reversely operated until velocity of actuator goes down to zero.

10. An actuator access control system according to claim 9, wherein said velocity profile generators are the exponential function generators.

11. An actuator access control system comprising a velocity profile generator (57) which generates velocity reference signal depending upon seek stroke so that an actuator is driven by trapezoidal current; a ROM pointer (55) for generating velocity reference pattern depending upon seek stroke; a track counter (56) for providing a seek length and remaining length by a pulse signal which is provided when a head crosses a track; a ½ seek stroke detector (59) which detects that a head reaches ½ seek stroke; an up/down selector (60) for indicating one of acceleration mode and deceleration mode; a time counter (61) for designating constant speed period by a track cross pulse; a count limiter (62) for indicating change of acceleration by a track cross pulse; and a smoother (63) for smoothing a velocity signal;

wherein in acceleration period the track counter (56) is incremented and the velocity reference signal is provided by the velocity profile generator (57. 58) until the count limiter (62) operates, then, the track counter (56) stops and the time counter (61) is incremented until the ½ seek stroke detector (59) recognizes that a head reaches ½ seek stroke, and in deceleration period, velocity reference signal is generated by decrementing the counters in opposite steps of acceleration period.

* * * * *